United States Patent [19]

Kanda

[11] Patent Number: 4,739,979
[45] Date of Patent: Apr. 26, 1988

[54] FLUID-FILLED RESILIENT SUPPORT STRUCTURE

[75] Inventor: Ryouji Kanda, Inuyama, Japan

[73] Assignee: Tokai Rubber Industries, Ltd., Aichi, Japan

[21] Appl. No.: 909,715

[22] Filed: Sep. 22, 1986

[30] Foreign Application Priority Data

Sep. 26, 1985 [JP] Japan ............................ 60-146804[U]

[51] Int. Cl.$^4$ ................................................ F16F 5/00
[52] U.S. Cl. .................................. 267/140.1; 188/320; 248/562
[58] Field of Search .................... 267/140.2–140.5, 267/140.1, 141, 141.1–141.7, 8 R, 35, 63 R, 64.27; 248/562, 636; 180/300, 312; 280/708, 709; 188/298, 315, 322, 13, 320

[56] References Cited

U.S. PATENT DOCUMENTS

| | | | |
|---|---|---|---|
| 2,668,033 | 2/1954 | Lee ...................................... | 267/140.3 |
| 4,571,215 | 2/1986 | Hansen ............................ | 267/141.1 X |
| 4,573,656 | 3/1986 | Yoshida et al. ................. | 267/140.1 X |

FOREIGN PATENT DOCUMENTS

| | | | |
|---|---|---|---|
| 0025459 | 3/1981 | European Pat. Off. ............. | 180/312 |
| 48-36151 | 11/1973 | Japan . | |
| 52-16554 | 5/1977 | Japan . | |
| 0037349 | 2/1984 | Japan ............................... | 267/140.1 |
| 59-37348 | 2/1984 | Japan . | |
| 0156184 | 9/1921 | United Kingdom ............. | 267/64.27 |
| 2041485 | 9/1980 | United Kingdom ............... | 267/8 R |

*Primary Examiner*—Andres Kashnikow
*Assistant Examiner*—Richard Potosnak
*Attorney, Agent, or Firm*—Parkhurst & Oliff

[57] ABSTRACT

A fluid-filled resilient support structure including a first annular resilient member disposed radially outwardly of an inner sleeve, a pair of annular closure members closing opposite ends of an annular space between the inner sleeve and the first resilient member, a cylindrical member fitted on an intermediate portion of the inner sleeve, an orifice member spaced radially outwardly from the cylindrical member, a second annular resilient member between the orifice member and the cylindrical member, and an outer sleeve fitted on the outer surface of the orifice member. The orifice member has a radially outer portion sandwiched between upper and lower portions of the first resilient member in the axial direction. The orifice and cylindrical members and the second resilient member axially divide the annular space into two fluid chambers which are closed at the opposite axial ends of the first resilient member by the closure members. The orifice member has a circumferential groove formed in its outer surface. The length of the groove is not less than one full outer circumference of the orifice member. The outer sleeve closes the groove and thereby defines a circumferential orifice through which the two fluid chambers communicate with each.

6 Claims, 3 Drawing Sheets

FLUID-FILLED RESILIENT SUPPORT STRUCTURE

BACKGROUND OF THE INVENTION

1. Field of the Invention

The present invention relates in general to a resilient support structure which is employed in a vibration system as in an automotive vehicle, for damping and isolating vibrations. More particularly, the invention is concerned with a fluid-filled resilient support structure which is adapted primarily for damping and isolating vibrations in the axial direction of the structure, and which uses a resilient member for isolating the vibrations through its elastic deformation, and an incompressible fluid for damping the vibrations due to a resistance to a flow of the fluid through an orifice formed in the structure.

2. Discussion of the Prior Art

As resilient support structures used in vibration systems as in a motor vehicle, for damping and isolating vibrations, there are known strut mounts and member mounts installed in a suspension system of the vehicle. Such conventional resilient support structures employ a cylindrical resilient or elastic member, alone or in combination with another member formed of a synthetic resin or canvas, for damping and isolating vibrations by means of elastic deformation of the resilient member. In this type of resilient support structure which relies on elastic deformation of a resilient member for damping and isolating vibrations, increasing the dynamic spring rate or constant of the resilient member for improved vibration isolating effect for reduced high-frequency vibrations and noises will unfavorably result in an increase in the loss factor of the resilient member, which reduces the damping effect for low-frequency vibrations or oscillations.

In the light of the above inconvenience, a fluid-filled resilient support structure is proposed in Publications Nos. 48-36151 and 52-16554 of Japanese Patent Applications, which were published for opposition purpose in 1973 and 1977. The proposed support structure utilizes an incompressible fluid to provide an improved vibration damping effect based on a resistance of flow of the fluid through an orifice formed in the structure. This type of fluid-filled resilient support structure utilizing elastic deformation of a resilient member and a flow resistance of an incompressible fluid is excellent in terms of its vibration damping capability as well as its vibration isolating capability. However, the fluid-filled resilient support structure disclosed in the above-identified documents is constructed primarily for isolating and damping vibrations that are applied to the structure in the radial direction of the resilient member. Hence, it is difficult to use the proposed support structure as a strut mount or a member mount, wherein major vibrations to be damped and isolated are applied in the axial direction of the resilient member.

In the meantime, such a fluid-filled resilient support structure adapted to damp and isolate the axial vibrations is disclosed in Laid-Open Publication No. 59-37348 of Japanese Patent Application.

However, the support structure disclosed in the above document suffers from a drawback that two identical units must be used as a set of support structures when the support structure is installed in place. Further, each unit is considerably complicated in construction, having a plurality of pockets or voids which are formed in each of the inner and outer surfaces of a resilient rubber member, such that the voids are spaced from each other in the circumferential direction of the rubber member. Accordingly, this known support structure is not completely satisfactory in ease of manufacture, assembling and installation, and is therefore undesirable in terms of its costs of production and installation.

SUMMARY OF THE INVENTION

It is therefore an object of the present invention to provide an improved fluid-filled resilient support structure which has substantially eliminated the inconveniences encountered in the known counterparts as discussed above.

According to the present invention, there is provided a fluid-filled resilient support structure comprising: (a) an inner sleeve; (b) a first resilient member having an annular shape, disposed radially outwardly of the inner sleeve in coaxial relation with each other, with a predetermined radial distance therebetween; (c) a pair of generally annular closure members disposed at opposite axial ends of the inner sleeve and the first resilient member, the closure members fluid-tightly closing opposite ends of an annular space formed between the inner sleeve and the first resilient member; (d) a cylindrical member fitted on an outer surface of an axially intermediate portion of the inner sleeve; (e) a generally annular thick-walled orifice member disposed radially outwardly of the cylindrical member in coaxial relation with each other, with a predetermined radial distance therebetween, the orifice member including a radially outer portion sandwiched between upper and lower portions of the first resilient member in an axial direction thereof, the orifice member having a circumferential groove formed continuously in an outer circumferential surface thereof, the circumferential groove having a length not less than one full outer circumference of the orifice member, the orifice member further having communication holes which communicate at their one end with corresponding ends of the circumferential orifice, and at their other end with the annular space inside the first resilient member; (f) a second resilient member having an annular shape, disposed between the orifice member and the cylindrical member and secured thereto, the second resilient member, the orifice member and the cylindrical member cooperating with each other to axially divide the annular space, and further cooperating with the inner sleeve, the first resilient member and the pair of closure members, to define a pair of annular fluid chambers filled with an incompressible fluid; and (g) an outer sleeve fitted on the outer surface of the orifice member and fluid tightly closing the circumferential groove, so as to define a continuous circumferential orifice having a length corresponding to that of the circumferential groove, the pair of fluid chambers communicating with each other through the circumferential orifice and the communication holes.

In the fluid-filled resilient support structure, the two annular fluid chambers filled with an incompressible fluid are formed between the inner sleeve and the first resilient member. These fluid chambers are held in communication with each other through the circumferential orifice defined by the circumferential groove which is formed in the outer surface of the orifice member and closed by the outer sleeve. When the inner and outer sleeves are axially moved relative to each other, the first and second resilient members are elastically deformed, whereby the volume of one of the two fluid chambers is increased while the volume of the other fluid chamber is decreased. Accordingly, the incompressible fluid is forced to flow through the circumferential orifice from the fluid chamber whose volume is decreased, to the fluid chamber whose volume is increased.

Therefore, vibrational loads applied to the inner and outer sleeves of the present support structure in the axial direction may be excellently damped by means of a resistance of flow of the fluid through the circumferential orifice. This flow resistance of the fluid provided by the orifice, and the elastic deformation of the first and second resilient members, are suitably combined to provide enhanced vibration damping and isolating effects.

In the present support structure, the second resilient member is effective in minimizing a transfer of vibrations between the inner and outer sleeves in the radial direction.

The fluid-filled support structure constructed to provide high capability in both vibration damping and isolation is available as a single assembly, unlike a conventional structure which uses two identical component units arranged as a set. Accordingly, the instant support structure is improved in efficiency of production, assembling and installation.

Further, the orifice member which has the continuous circumferential groove for the circumferential orifice serves to define the two annular fluid chambers, in cooperation with the cylindrical member, and the second resilient member fitted on the cylindrical member. Since the circumferential groove has a length not less than one full outer circumference of the orifice member, the circumferential orifice defined by the outer sleeve and the circumferential groove is sufficiently long, thus providing a sufficiently large resistance to a flow of the fluid from one of the chambers to the other via the communication holes, even if the cross sectional area of the orifice is relatively large. Accordingly, the instant support structure has an improved damping effect for low-frequency vibrations. It is noted that a vibration damping effect may be more or less expected with an orifice formed in the axial direction of the orifice member. In this case, however, the length of the orifice tends to be short, which is not desirable for damping vibrations of a low frequency band. Therefore, the fluid-filled resilient support structure having such an axial orifice is not so desirable.

A further advantage of the instant support structure is offered by the use of the cylindrical member. More specifically, the second resilient member is formed between the outer surface of the inner cylindrical member and the inner surface of the outer orifice member. After the second resilient member is formed with the cylindrical and orifice members secured thereto, the second resilient member can be easily pre-compressed in the radially outward direction by simply expanding the inner cylindrical member before the inner sleeve is inserted through the cylindrical member. The radial pre-compression of the second resilient member leads to improvement of its durability, and consequent prolongation of the life expectancy of the resilient support structure. Further, the first resilient member may be axially inwardly pre-compressed between the closure members, and the orifice member (and the outer sleeve if appropriate).

According to one advantageous feature of the invention, the support structure further comprises at least one annular caulking member each fixed to a corresponding one of opposite axial ends of the first resilient member, for fluid-tightly securing the corresponding end of the first resilient member to a corresponding one of the pair of closure members, by means of caulking of the at least one annular caulking member against a radially outer portion of the corresponding closure member.

According to another advantageous feature of the invention, the support structure further comprises a pair of rubber layers exposed in the pair of fluid chambers, respectively. Each of the rubber layers is secured by vulcanization to one of opposite surfaces of the orifice member and the closure members which face each other in the axial direction of the orifice member. The rubber layers are abuttable on the other of the opposite surfaces, thereby elastically preventing an excessive axial relative displacement between the orifice member and the closure members.

According to a further advantageous feature of the invention, at least one of the pair of closure members is fitted on the outer surface of the inner sleeve, with an annular sealing member interposed between an inner surface of the at least one closure member and the outer surface of the inner sleeve to maintain fluid tightness between the at least one closure member and the inner sleeve.

According to a yet further advantageous feature of the invention, at least one of the pair of closure members is formed as an integral part of the inner sleeve formed at corresponding one of the opposite axial ends of the inner sleeve.

BRIEF DESCRIPTION OF THE DRAWINGS

The above and other objects of the present invention will be better understood by reading the following description of a preferred embodiment of the invention, when considered in connection with the accompanying drawings, in which.

DETAILED DESCRIPTION OF THE PREFERRED EMBODIMENT

To further clarify the present invention, a preferred embodiment of the invention will be described in detail, by reference to the accompanying drawings.

Figure 1:
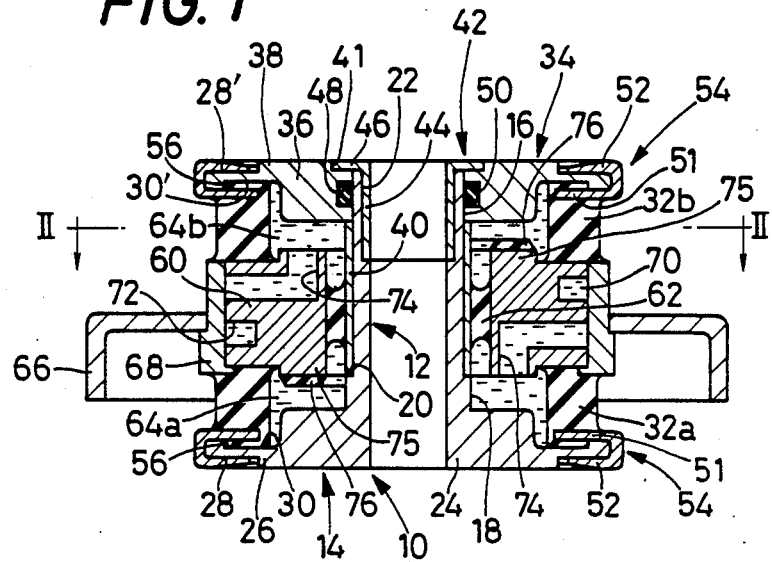
FIG. 1 is an elevational view in longitudinal cross section of a fluid-filled resilient support structure of one embodiment of the invention (taken along line I—I of FIG. 2)
Figure 2:
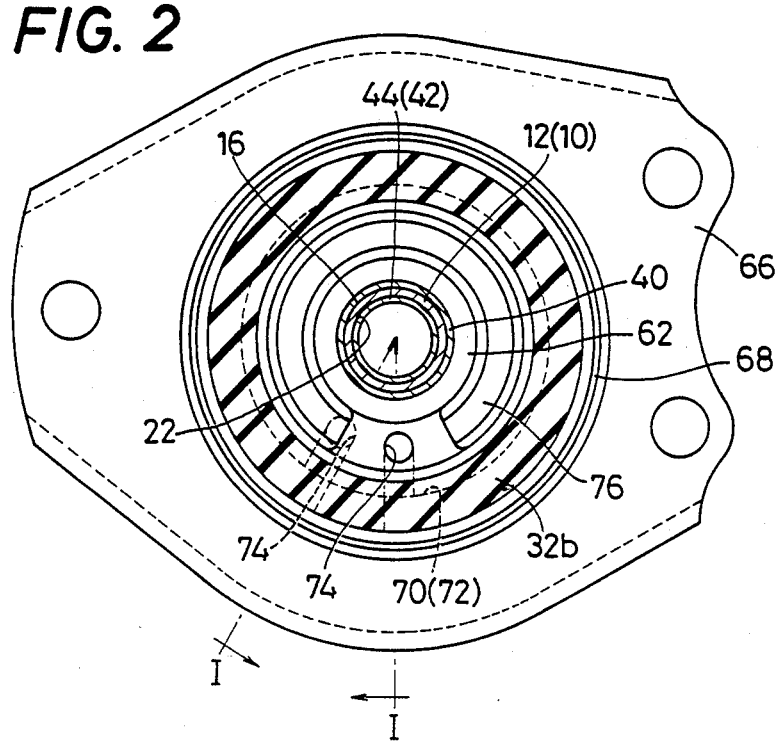
FIG. 2 is a cross sectional view taken along line II—II of FIG. 1.

Referring first to FIGS. 1 and 2 which are longitudinal and transverse cross sectional views of one embodiment of the invention in the form of a strut mount for an automotive vehicle, reference numeral 10 designates an inner sleeve which consists of a thick-walled cylindrical portion 12 through which a suitable inner shaft is inserted for attachment thereto, and an annular portion 14 which extends from one axial end portion of the cylindrical portion 12 in the radially outward direction.

Figure 3:
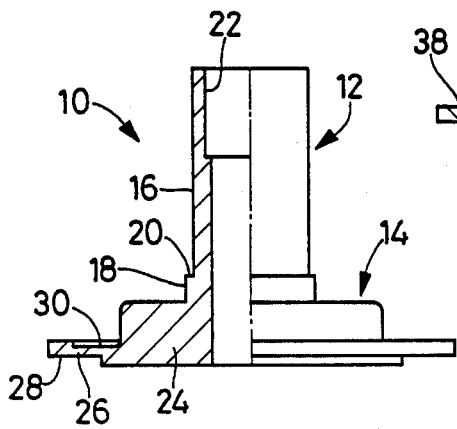
FIG. 3 is an elevational view showing an inner sleeve of the embodiment of FIG. 1, partly in cross section.

As shown in FIG. 3, the cylindrical portion 12 has a small-diameter portion 16 over a considerable length thereof, and a relatively short large-diameter portion 18 at one of its axial ends on the side of the annular portion 14. The large-diameter portion 18 has a shoulder face 20 at its axial end on the side of the small-diameter portion 16. The cylindrical portion 12 has a central bore which has a large-diameter portion 22 which is formed at one end portion of the small-diameter portion 16 remote from the large-diameter portion 14. The annular portion 18 includes a radially inner thick-walled portion 24 and a radially outer, relatively thin-walled flange portion 26. The flange portion 26 extends from the the outer circumference of the thick-walled portion 24 in the radially outward direction. The flange portion 26 has an annular cutout in a radially outer portion of one of opposite surfaces which faces outwardly in the axial direction of the inner sleeve 10. In a radially inner portion of the other surface of the flange portion 26 which faces axially inwardly of the inner sleeve 10, there is formed an annular groove 30. In the present embodiment, the cylindrical portion 12 of the inner sleeve 10 functions as an inner sleeve commonly used in a fluid-filled resilient support structure, as will be understood from the following description.

Referring back to FIGS. 1 and 2, reference numerals 32a, 32b designate a first resilient member in the form of a pair of rubber members 32a, 32b which have a comparatively low spring rate or constant. These rubber members 32a, 32b are disposed radially outwardly of the cylindrical portion 12 of the inner sleeve 10, in coaxial or concentric relation with each other, with a suitable radial distance from the cylindrical portion 12. The lower rubber member 32a is fluid-tightly secured at its axially outer end to the flange portion 26 of the annular portion 14 of the inner sleeve 10, while the upper rubber member 32b is fluid-tightly secured at its axially outer end to a closure plate 34 disposed at the end of the inner sleeve 10 on the side of the small-diameter portion 16. The rubber members 32a, 32b cooperate with the inner sleeve 10, closure plate 34 and other members (orifice member 60 and inner rubber member 62 which will be described), to define a pair of fluid-tight annular fluid chambers 64a, 64b which will be described in detail.

Figure 4:
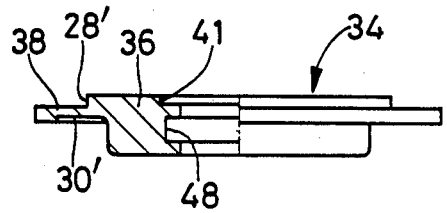
FIG. 4 is an elevational view showing a closure plate of the embodiment of FIG. 1, partly in cross section.

As indicated in FIG. 4, the closure plate 34 has a generally annular shape, and consists of a radially inner thick-walled portion 36 and a radially outer thin-walled flange portion 38, like the annular portion 14 of the inner sleeve 10. The closure plate 34 is press-fitted on the outer surface of the small-diameter portion 16 of the cylindrical portion 12 of the inner sleeve 10, and is retained by a retainer sleeve 42 press-fitted in the large-diameter portion 22 of the central bore of the cylindrical portion 12. Between the closure plate 34 and the shoulder surface 20 of the inner sleeve 10, a metallic sleeve 40 is fitted on the outer surface of the small-diameter portion 16 of the inner sleeve 10.

Figure 5:
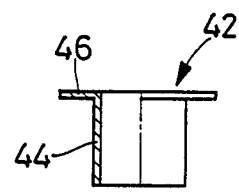
FIG. 5 is an elevational view showing a mounting sleeve of the embodiment of FIG. 1, partly in cross section.

As shown in FIG. 5, the retainer sleeve 42 has a flange 46 which radially outwardly extends from the axially outer end of a cylindrical portion 44 engaging the large-diameter portion 22 of the bore of the cylindrical portion 12 of the inner sleeve 10. This flange 46 acts to press the closure plate 34 in the axially inward direction, and consequently press the metallic sleeve 40 against the shoulder face 20 of the cylindrical portion 12, whereby the closure plate 34 is held in place. The closure plate 34 has an annular groove 48 in an axially middle of its inner surface. The annular groove 48 accommodates an O-ring 50 as shown in FIG. 1, to provide fluid tightness between the small-diameter portion 16 of the cylindrical portion 12 of the inner sleeve 10, and the closure plate 34.

Thus, the closure plate 34 is fluid-tightly secured to the small-diameter portion 16 of the cylindrical portion 12 of the inner sleeve 10, by the retainer sleeve 42 which is press-fitted in the cylindrical portion 12. Further, the O-ring 50 accommodated in the annular groove 48 in the closure plate 34 serves as an annular sealing member.

The flange portion 38 of the closure plate 34 has an annular cutout 28' similar to the annular cutout 28 of the flange portion 26 of the annular portion 14 of the inner sleeve 10, and further has an annular groove 30' similar to the annular groove 30 of the annular portion 14. The closure plate 34 has an annular cutout 41 in which the flange 46 of the retainer sleeve 42 is fitted such that the end face of the flange 46 is flush with the outer end face of the closure plate 34.

Figure 6:
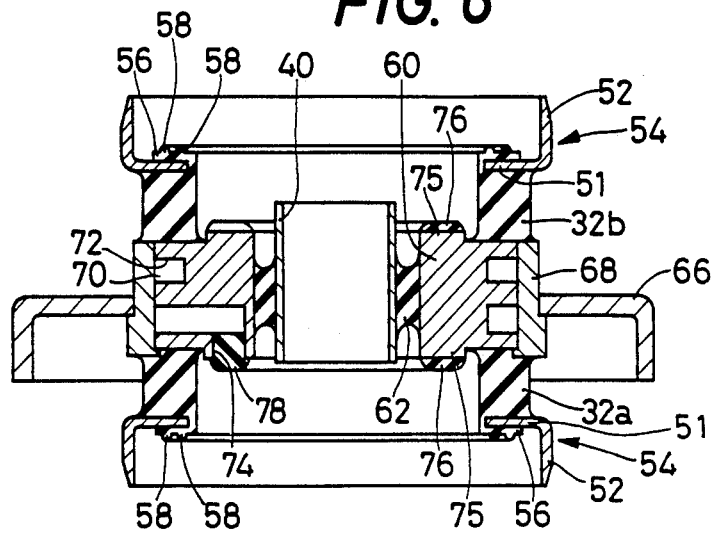
FIG. 6 is an elevational view in longitudinal cross section of a sub-assembly of the embodiment of FIG. 1 consisting of first and second rubber members and other components secured to the rubber members by vulcanization (a cross sectional view taken along line VI—VI of FIG. 7)
Figure 7:
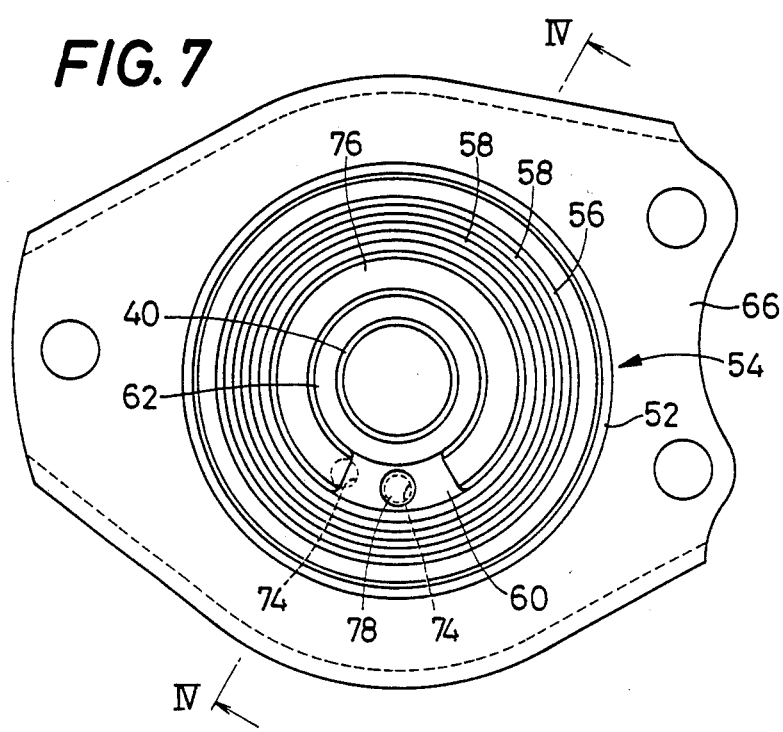
FIG. 7 is a plan view of the sub-assembly of FIG. 6.

Each of the lower and upper rubber members 32a, 32b is provided at its axially outer end with an annular caulking member 54 fixed thereto by means of vulcanization during molding of the rubber members. Each caulking member 54 has a fixed portion 51 embedded in the corresponding lower or upper rubber member 32a, 32b, and a caulking portion 52 which is perpendicular to the fixed portion 51 before the strut mount is completely assembled, as shown in FIGS. 6 and 7. During the assembling procedure, the caulking portion 52 of each caulking member 54 is bent against the bottom surface of the annular cutout 28, 28' formed in the end face of the annular portion 26 of the inner sleeve 10 or the end face of the closure plate 34, such that the bent caulking portion 52 is flush with the corresponding end face of the annular portion 26 or closure plate 34, as indicated in FIG. 1. Thus, the lower and upper rubber members 32a, 32b which constitute a first resilient member are fixed by the caulking members 54, 54 to the annular portion 26 and the closure plate 34, respectively.

Each of the rubber members 32a, 32b has a sealing portion 56 which covers a radially inner portion of the axially outer surface of the fixed portion 51 of the caulking member 54. As indicated in FIG. 1, the sealing portions 56, 56 of the lower and upper rubber members 32a, 32b are accommodated in the annular grooves 30, 30' formed in the corresponding flange portion 26, 38, and are held in pressed contact with the bottom surfaces of the annular grooves 30, 30'. In this manner, the fluid tightness is maintained between the caulking members 54, 54 and the flange portions 26, 38.

As described above, the annular space (annular fluid chambers 64a and 64b) formed between the cylindrical portion 12 of the inner sleeve 10 and the first resilient member (lower and upper rubber members 32a, 32b) is fluid-tightly closed at its opposite ends by the annular portion 14 of the inner sleeve 10 and the closure plate 34, respectively. In other words, the annular portion 14 and the closure plate 34 serve as closure members for closing the axially outer ends of the annular spaces formed between the cylindrical portion 12 and the rubber members 64a, 64b, respectively.

Referring again to FIGS. 6 and 7, each of the sealing portions 56, 56 has two annular sealing lips 58, 58 which are spaced apart from each other in the radial direction of the rubber members 32a, 32b. With the caulking members 54, 54 forcing the sealing portions 56, 56 against the corresponding flange portions 26, 38 in the axially outward directions of the rubber members 32a, 32b, the sealing lips 58, 58 are held in pressed contact with the bottom surfaces of the annular grooves 30, 30' formed in the annular portion 14 and the closure plate 34. Thus, the sealing lips 58, 58 serve to enhance the fluid tightness between the rubber members 32a, 32b and the corresponding closure members 14, 34.

As shown in FIGS. 1 and 2, the lower and upper rubber members 32a, 32b which constitute the first resilient member as previously indicated are separated from each other by a thick-walled annular orifice member 60 which is disposed in an axially intermediate portion of the inner sleeve 10, in coaxial relation with the inner sleeve 10, such that a radially outer portion of the orifice member 60 is sandwiched by the lower and upper rubber members 32a, 32b.

Described in greater detail, the orifice member 60 is positioned with its inner circumferential surface spaced a suitable distance radially outwardly from the outer surface of the metallic sleeve 40 which is press-fitted on the small-diameter portion 16 of the inner sleeve 10, between the shoulder face 20 of the cylindrical portion 12 and the thick-walled portion 36 of the closure plate 34. Between the metallic sleeve 40 and the orifice member 60, there is formed a second resilient member in the form of an annular inner rubber member 62 made of a material similar to that of the lower and upper outer rubber members 32a, 32b (first resilient member). The inner rubber member 62 cooperates with the orifice member 60 and the metallic sleeve 40 to axially divide the annular space between the cylindrical portion 12 and the first resilient member 32a, 32b, into the lower fluid chamber 64a inside the rubber member 32a, and the upper fluid chamber 64b inside the upper rubber member 32b. The inner rubber member 62 is bonded to the metallic sleeve 40 and the orifice member 60 by means of vulcanization during molding of the rubber members 32a, 32b, 62. The fluid chambers 64a, 64b are filled with a suitable incompressible fluid such as water, polyalkylene grycols, silicone oils, low molecular weight polymers, or a mixture thereof. The inner rubber member 62 is radially outwardly pre-compressed by a suitable amount, by radially outward expansion of the inner metallic sleeve 40 after the rubber member 62 is molded. In the present embodiment, the metallic sleeve 40 functions as a cylindrical member on which the second resilient member 62 is formed.

An outer sleeve 68 is press-fitted on the outer surface of the orifice member 60. As indicated in FIG. 1, the outer sleeve 68 has a mounting bracket 66 fixed to its outer surface. The outer sleeve 68 is partially embedded in the first resilient member 32a, 32b, namely, sandwiched between the lower and upper outer rubber members 32a, 32b. The orifice member 60 and the outer sleeve 68 cooperate with each other to define a circumferential orifice 70 through which the two annular fluid chambers 64a, 64b are held in communication with each other, as described below in detail.

Figure 8:
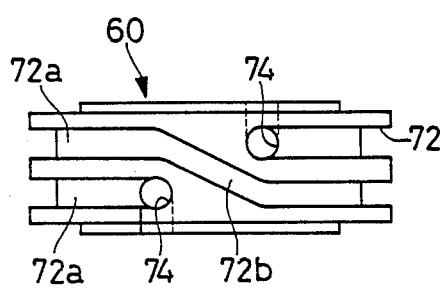
FIG. 8 is an elevational view of an orifice member of the embodiment of FIG. 1.
Figure 9:
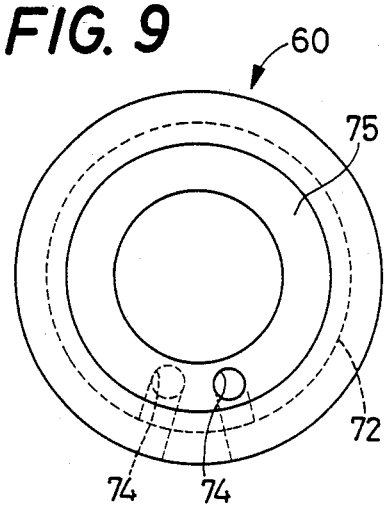
FIG. 9 is a plan view of the orifice member of FIG. 8.

Referring now to FIGS. 8 and 9, the orifice member 60 has a continuous circumferential groove 72 formed in its outer circumferential surface. The circumferential groove 72 has almost two turns round the circumference of the orifice member 60, such that the almost two turns have a predetermined pitch in the axial direction of the orifice member 60. More specifically, the circumferential groove 72 has two straight portions 72a perpendicular to the axis of the orifice member 60, and one helical or inclined portion 72b which connects the two straight portions 72a to each other. The helical portion 72b is inclined by a predetermined angle relative to the straight portions 72a, so that the two straight portions 72a are spaced from each other in the axial direction of the orifice member 60, to provide the predetermined pitch indicated above. With the outer sleeve 68 fitted on the outer circumferential surface of the orifice member 60, the circumferential groove 72 is closed by the inner surface of the outer sleeve 68, whereby the continuous circumferential orifice 70 indicated above is formed. The orifice member 60 has a pair of communication holes 74, 74 which communicate at their one end with the corresponding ends of the circumferential groove 72, and which are open at their other end in the corresponding axial end faces of the orifice member 60, as indicated in FIGS. 8 and 9. Therefore, the two fluid chambers 64a, 64b are held in communication with each other through the circumferential orifice 70 and the communication holes 74, 74. In the present embodiment, the cross sectional area of the communication holes 74, 74 is equal to that of their circumferential orifice 70.

As indicated in FIGS. 1, 6 and 9, annular raised portions 75, 75 are formed on radially inner parts of the opposite axial end faces of the orifice member 60. The above-indicated communication holes 74, 74 are open in the surfaces of these annular raised portions 75, 75. The surfaces of the annular raised portions 75, 75, except the areas surrounding the open ends of the holes 74, 74, are covered with respective rubber layers 76, 76 of a material similar to those of the rubber members 32a, 32b, 62. The rubber layers 76, 76 are abuttable on the inner surface of the thick-walled portion 24 of the annular portion 14 of the inner sleeve 10, or the inner surface of the thick-walled portion 36 of the closure plate 34, when an excessively large axial relative displacement takes place between the orifice member 60 and the inner sleeve 10, i.e., between the inner and outer sleeves 10, 68. Thus, the axial displacement of the inner and outer sleeves 10, 68 relative to each other is limited by the elastic abutment of the rubber layers 76 on the thick-walled portions 24, 36.

The outer sleeve 68 is attached to a suitable member of the vehicle, via the mounting bracket 66 fixed thereto.

The strut mount constructed according to the invention as described above is assembled with the following procedure:

Initially, the caulking members 54, 54 (in their original states as shown in FIG. 6), the orifice member 60 with the outer sleeve 68 press-fitted thereon, and the metallic sleeve 40, are suitably positioned within a mold, and an unvulcanized rubber material is poured into the mold, whereby the rubber members 32a, 32b and 62 and the rubber layers 76, 76 are formed. Then, the metallic sleeve 40 is radially outwardly expanded by a suitable amount, in order to give the inner rubber member 62 (second resilient member) a suitable amount of pre-compression. In this manner, a sub-assembly shown in FIGS. 6 and 7 is obtained. Before the rubber members 32a, 32b, 62 and the rubber layers 76, 76 are molded, the open ends of the communication holes 74, 74 in the orifice member 60 are closed with plugs 78, 78 as shown in FIGS. 6 and 7, so as to prevent flow of the rubber material into the holes 74, 74 during the molding process.

Then, the sub-assembly of FIGS. 6–7 is placed in a bath of an incompressible fluid previously indicated, and the inner sleeve 10 is inserted into the metallic sleeve 40, such that the small-diameter portion 16 of the cylindrical portion 12 is press-fitted in the metallic sleeve 40. Subsequently, the closure plate 34 is press-fitted on the small-diameter portion 16 of the inner sleeve 10, and the retainer sleeve 42 is forced into the large-diameter portion 22 of the central bore formed in the small-diameter portion 16. Thus, the sub-assembly and the closure plate 34 are fixed to the inner sleeve 10 by the retainer sleeve 42, with the rubber members 32a, 32b pre-compressed in the axially inward directions. Since the above procedure is effected within the batch of the incompressible fluid, the annular fluid chambers 64a, 64b are filled with the incompressible fluid.

Subsequently, the caulking portions 52 of the caulking members 54 secured to the lower and upper rubber members 32a, 32b are bent radially inwardly of the rubber members and pressed against the corresponding flange portions 26, 38, as indicated in FIG. 1. In this way, the rubber members 32a, 32b are fixed at their axially outer ends to the annular portion 14 of the inner sleeve 10 and the closure plate 34, respectively.

The above procedure permits high assembling efficiency of the strut mount, since the fluid chambers 64a, 64b may be automatically filled with the incompressible fluid while the strut mount is assembled.

As previously mentioned, the thus produced strut mount is installed with the inner and outer sleeves 10, 68 fixed to the appropriate members of the vehicle. When vibrational loads of low frequencies are applied to the strut mount in the axial direction, the first or outer rubber members 32a, 32b are elastically deformed in the corresponding directions, thereby causing one of the two fluid chambers 64a, 64b to have a reduced volume, and the other fluid chamber to have an increased volume. As a result, the incompressible fluid is forced to flow through the circumferential orifice 70 from the fluid chamber whose volume is reduced, to the fluid chamber whose volume is increased. Since the orifice 70 has a resistance to a flow of the fluid therethrough, the axial low-frequency vibrational loads are damped by the flow resistance of the fluid provided by the orifice 70. Since the orifice 70 has a sufficient length (almost two times as large as the outer circumference of the orifice member 60), the strut mount provides a sufficient damping effect for the low-frequency vibrations.

The illustrated strut mount is used as a single unit, rather than as an assembly of two mounting units as conventionally employed to form a strut mount structure. Accordingly, the fluid-filled resilient support structure in the form of the illustrated strut mount is easier to assemble and install on the vehicle, and therefore more economical to manufacture and install.

In the illustrated embodiment, the inner rubber member 62 serving as the second resilient member may be given a desired amount of radial pre-compression by simply expanding the metallic sleeve 40. This is an additional advantage of the present embodiment.

Further, the rubber layers 76 serve to effectively reduce abutting impacts between the orifice member 60 and the annular portion 14 of the inner sleeve 10 or the closure plate 34, upon excessive axial relative displacement between the inner and outer sleeves 10, 68. Similar effect may also be obtained if rubber layers similar to the rubber layers 76, 76 are formed on the inner surfaces of the annular portion 14 and the closure plate 34 which are opposite to the raised portions 75, 75 of the orifice member 60.

The second resilient member 62 provided between the metallic sleeve 40 and the orifice member 60 advantageously provide a damping effect for radial vibrations applied to the strut mount in its radial directions.

While the present invention has been described in its preferred embodiment with a certain degree of particularity, it is to be understood that the preferred embodiment is given for illustrative purpose only, and that the present invention is not limited to the details of the illustrated embodiment.

In the illustrated embodiment, the closure plate 34 which functions as one of the two closure members is fixed to the inner sleeve 40 by the retainer sleeve 42 which is press-fitted in the cylindrical portion 12 of the inner sleeve 10. However, the closure plate 34 may be fixed to the inner sleeve 10 by caulking the corresponding end portion of the cylindrical portion 12.

While the fluid tightness between the closure plate 34 and the cylindrical portion 12 of the inner sleeve 10 is maintained by the O-ring 50 accommodated in the annular groove 48 in the inner surface of the closure plate 34, it is possible to use other sealing means. For example, the cylindrical portion 12 may be formed with a shoulder face at a suitable position on its outer surface, so that the closure plate 34 is held in abutting contact with the shoulder face, via a suitable sealing rubber layer interposed therebetween which provides the fluid tightness between the closure plate 34 and the cylindrical portion 12.

In the illustrated embodiment, the closure plate 34 closes the end of the annular space formed between the upper rubber member 32b and the cylindrical portion 12, while the annular portion 14 of the inner sleeve 10 closes the end of the annular space formed between the lower rubber member 32a and the cylindrical portion 12. However, it is possible to use to replace the annular portion 14 by another closure plate.

Although the caulking members 54 fixed to the rubber members 32a, 32b are caulked against the annular portion 14 and closure plate 34 to fluit-tighly secure the rubber members thereto, the flange portions 26, 38 of the annular portion 14 and the closure plate 34 may be caulked against suitable annular members fixed to the rubber members 32a, 32b. Further, the sealing portions 56 of the rubber members 32a, 32b may be replaced by sealing rubber layers which may or may not be secured to the annular portion 14 and the closure plate 34. Such sealing rubber layers may or may not be secured to the caulking members 54.

While the damping effect provided by the circumferential orifice 70 increases with an increase in its length, the orifice 70 provides a sufficient damping effect for the axial vibrations, provided the length of the orifice 70 is equal to or larger than the circumference of the orifice member 60.

Although the illustrated embodiment of the invention is adapted to be suitably used as a strut mount for automobiles, the invention may be embodied as other types of fluid-filled resilient support structures such as differential mounts, engine mounts, tension rod bushings, and other mounting units for mounting various members of automotive vehicles.

It will be understood that various other changes, modifications and improvements may be made in the invention, without departing from the spirit and scope of the invention defined in the following claims.

What is claimed is:

1. A fluid-filled resilient support structure connected between two members of a vibration system, comprising:

an inner sleeve fixed to one member of said two members of the vibration system;

a first resilient member having an annular shape, disposed radially outwardly of said inner sleeve in coaxial relation with each other, with a predetermined radial distance therebetween;

a pair of generally annular closure members disposed at opposite axial ends of said inner sleeve and said first resilient member, said closure members fluid-tightly closing opposite ends of an annular space formed between said inner sleeve and said first resilient member;

a cylindrical member fitted on an outer surface of an axially intermediate portion of said inner sleeve;

a generally annular thick-walled orifice member disposed radially outwardly of said cylindrical member in coaxial relation with each other, with a predetermined radial distance therebetween, said orifice member including a radially outer portion sandwiched between upper and lower portions of said first resilient member in an axial direction thereof, said orifice member having a circumferential groove formed continuously in an outer circumferential surface thereof, said circumferential groove having a length not less than one full outer circumference of said orifice member, said orifice member further having communication holes which communicate at their one end with corresponding ends of said circumferential orifice, and at their other end with said annular space inside said first resilient member;

a second resilient member having an annular shape, disposed between said orifice member and said cylindrical member and secured thereto, said second resilient member, said orifice member and said cylindrical member cooperating with each other to axially divide said annular space, and further cooperating with said inner sleeve, said first resilient member and said pair of closure members, to define a pair of annular fluid chambers filled with an incompressible fluid; and an outer sleeve fixed to the other one of said two members of the vibration system and fitted on the outer surface of said orifice member, said outer sleeve fluid tightly closing said circumferential groove, so as to define a continuous circumferential orifice having a length corresponding to that of said circumferential groove, said pair of fluid chambers communicating with each other through said circumferential orifice and said communication holes.

2. A fluid-filled resilient support structure according to claim 1, further comprising at least one annular caulking member fixed to a corresponding one of opposite axial ends of said first resilient member, for fluid-tightly securing said corresponding end of said first resilient member to a corresponding one of said pair of closure members, by means of caulking of said at least one annular caulking member against a radially outer portion of said corresponding closure member.

3. A fluid-filled resilient support structure according to claim 1, further comprising a pair of rubber layers exposed in said pair of fluid chambers, respectively, each of said rubber layers being secured by vulcanization to one of opposite surfaces of said orifice member and said closure members which face each other in the axial direction of said orifice member, said rubber layers being abuttable on the other of said opposite surfaces, thereby elastically preventing an excessive axial relative displacement between said orifice member and said closure members.

4. A fluid-filled resilient support structure according to claim 1, wherein at least one of said pair of closure members is fitted on the outer surface of said inner sleeve, with an annular sealing member interposed between an inner circumferential surface of said at least one closure member and said outer surface of said inner sleeve to maintain fluid tightness between said at least one closure member and said inner sleeve.

5. A fluid-tight resilient structure according to claim 1, wherein one of said pair of closure members is formed as an integral part of said inner sleeve formed at a corresponding one of said opposite axial ends of said inner sleeve.

6. A fluid-tight resilient structure according to claim 2, wherein one of said pair of closure members is formed as an integral part of said inner sleeve formed at a corresponding one of said opposite axial ends of said inner sleeve.

* * * * *